United States Patent
Kondo et al.

(10) Patent No.: US 7,531,490 B2
(45) Date of Patent: May 12, 2009

(54) DETERGENT COMPOSITION COMPRISING CALCIUM GLUCONATE AND A MIXTURE OF CALCIUM ION SEQUESTERING AGENTS

(75) Inventors: Junji Kondo, Tokyo (JP); Yasunori Horio, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 11/237,760

(22) Filed: Sep. 29, 2005

(65) Prior Publication Data

US 2006/0079437 A1 Apr. 13, 2006

(30) Foreign Application Priority Data

Oct. 1, 2004 (JP) ............................. 2004-290542

(51) Int. Cl.
C11D 7/06 (2006.01)
C11D 3/43 (2006.01)
C11D 7/26 (2006.01)

(52) U.S. Cl. ................. 510/164; 510/112; 510/163; 510/179; 510/180; 510/188; 510/219; 510/225; 510/233; 510/246; 510/252; 510/317; 510/348; 510/432; 510/435; 510/477; 510/480

(58) Field of Classification Search ............. 510/164, 510/112, 163, 179, 180, 188, 219, 225, 233, 510/246, 252, 317, 348, 432, 435, 477, 480; 134/8

See application file for complete search history.

(56) References Cited

U.S. PATENT DOCUMENTS

| | | | | | |
|---|---|---|---|---|---|
| 2,524,218 | A | * | 10/1950 | Bersworth | 510/481 |
| 3,746,646 | A | * | 7/1973 | Bolxader | 510/309 |
| 3,798,168 | A | * | 3/1974 | Tumerman | 510/405 |
| 3,935,130 | A | * | 1/1976 | Hirano et al. | 510/238 |
| 4,446,035 | A | * | 5/1984 | Barrat et al. | 510/335 |
| 4,537,706 | A | * | 8/1985 | Severson, Jr. | 510/393 |
| 4,566,984 | A | * | 1/1986 | Bush | 510/434 |
| 4,747,977 | A | * | 5/1988 | Whitehead et al. | 510/321 |
| 4,798,679 | A | * | 1/1989 | Castro et al. | 510/417 |
| 4,968,451 | A | * | 11/1990 | Scheibel et al. | 510/299 |
| 5,472,628 | A | * | 12/1995 | Panandiker et al. | 510/300 |
| 5,710,120 | A | * | 1/1998 | Kanluen et al. | 510/421 |
| 5,731,276 | A | * | 3/1998 | Argo et al. | 510/284 |
| 5,824,531 | A | * | 10/1998 | Outtrup et al. | 435/202 |
| 5,883,062 | A | * | 3/1999 | Addison et al. | 510/235 |
| 6,162,783 | A | * | 12/2000 | McIver et al. | 510/320 |
| 6,294,511 | B1 | * | 9/2001 | Argo et al. | 510/238 |
| 6,365,561 | B1 | * | 4/2002 | Vinson et al. | 510/235 |
| 6,451,751 | B1 | * | 9/2002 | Busch et al. | 510/349 |
| 6,495,506 | B1 | * | 12/2002 | Massaux et al. | 510/417 |
| 6,624,132 | B1 | * | 9/2003 | Man et al. | 510/392 |
| 6,830,593 | B1 | * | 12/2004 | Vermote | 8/442 |
| 2003/0109394 | A1 | * | 6/2003 | Ruhr et al. | 510/202 |
| 2003/0176305 | A1 | * | 9/2003 | Hoyt et al. | 510/245 |
| 2005/0020464 | A1 | * | 1/2005 | Smith et al. | 510/220 |
| 2006/0079437 | A1 | * | 4/2006 | Kondo et al. | 510/505 |

FOREIGN PATENT DOCUMENTS

FR 2 876 114 * 4/2006
JP 11-172300 A * 6/1999

* cited by examiner

*Primary Examiner*—Charles I Boyer
(74) *Attorney, Agent, or Firm*—Birch, Stewart, Kolasch & Birch, LLP

(57) ABSTRACT

The present invention relates to a detergent composition containing (a) 2 to 30% by weight of an inorganic alkali, (b) 0.5 to 20% by weight of at least one surfactant selected from an anionic surfactant and a nonionic surfactant, (c) 0.01 to 2% by weight (based on calcium ion) of a calcium salt, (d) 0.1 to 15% by weight of a calcium ion-sequestering agent, (e) 1 to 30% by weight of a water-soluble organic solvent and (f) 20 to 95% by weight of water.

12 Claims, No Drawings

DETERGENT COMPOSITION COMPRISING CALCIUM GLUCONATE AND A MIXTURE OF CALCIUM ION SEQUESTERING AGENTS

FIELD OF THE INVENTION

The present invention relates to a detergent composition and to a cleaning method using the detergent composition.

BACKGROUND OF THE INVENTION

A plastic lens is lighter, more resistant to cracking and is dyed more easily than an inorganic type glass lens. In addition, an improvement in hardcoat techniques and the development of a resin material having a high refractive index have brought about the possibility of thinner and lighter lenses being produced. Plastic lenses in place of inorganic type glass lenses have been thereby spread in many fields of optical elements including glasses.

Plastic lens materials that have been most widely used are resins obtained by radical polymerization of allyl diglycol carbonate-(ADC). However, a resin material having a high refractive index has been developed in recent years. Typical examples of these resins include sulfur-containing plastic lens resins having a refractive index of 1.55 or more such as sulfur-containing urethane resins, sulfur-containing epoxy resins, polythio(meth)acrylate resins, sulfur-containing poly (meth)acrylate resins and episulfide resins.

A molding glass die is usually used for the production of a plastic lens. This molding glass die is cleaned after a lens is molded and used repeatedly many times. Examples of stains stuck to the molding glass die when molding a plastic lens include high-molecular weight resinous stains such as plastic lens molding raw materials, unreacted monomers, oligomers, polymers (resins), components bleeding out from gaskets, plasticizers, adhesives and removable adhesives derived from mold fixing tapes, fingerprints of operators and dusts in the atmosphere. Among these stains, plastic lens resins are highly crosslinked, secured very firmly to the mold and therefore is difficult to clean.

As detergents for molding glass die, for example, a detergent composition (JP-A 11-172300) containing an alkali agent, a specific surfactant, a calcium ion emitting material and water is currently known. This reference specifically discloses resins having a refractive index as low as 1.50 or less such as diethylene glycol bisallyl carbonate type plastic lens resins and urethane type resins which are currently mainstream cleaning subjects.

SUMMARY OF THE INVENTION

The present invention relates to a detergent composition containing:
(a) 2 to 30% by weight of an inorganic alkali;
(b) 0.5 to 20% by weight of at least one or more surfactant selected from the group consisting of an anionic surfactant and a nonionic surfactant;
(c) 0.01 to 2% by weight (based on calcium ion) of a calcium salt;
(d) 0.1 to 15% by weight of a calcium ion-sequestering agent);
(e) 1 to 30% by weight of a water-soluble organic solvent; and
(f) 20 to 95% by weight of water.

Also, the present invention relates to a method of cleaning a plastic lens molding glass die, having the steps of (A) cleaning a plastic lens molding glass die with the above detergent composition of the present invention and (B) rinsing the cleaned molding glass die with rinsing water.

Moreover, the present invention relates to use of the detergent composition for cleaning a plastic lens molding glass die.

DETAILED DESCRIPTION OF THE INVENTION

The present invention provides a detergent composition for a plastic lens molding glass die, the composition having high detergency to stains which are stuck to the surface of a plastic lens molding glass die and are difficult to clean, these stains including high-molecular weight resinous stains such as polymers (resins), adhesives and removable adhesives derived from a mold fixing tape and high-molecular weight resins such as plastic lens molding raw materials, unreacted monomers, oligomers, materials bleeding out from gaskets, plasticizers, adhesives and removable adhesives derived from mold fixing tapes, fingerprints of operators and dusts in the atmosphere, and particularly, stains of sulfur-containing plastics lens resins having a refractive index of 1.55 or more, has high resistance to corrosion of a glass die and is highly stable, and a cleaning method using the detergent composition.

The use of the detergent composition of the present invention ensures that the detergent composition exhibits high detergency to stains such as plastic lens resins which are stuck to the surface of a plastic lens molding glass die and are difficult to clean, plasticizers bleeding out from gaskets, removable adhesives of a mold-fixing tape, fingerprints of operators and dust in the atmosphere, and particularly, stains of sulfur-containing plastics lens resins having a refractive index of 1.55 or more, corrosion of a glass die is suppressed and the stability of the composition is well secured.

In a molding glass die used to produce a high-refractive index type sulfur-containing plastic lens having a refractive index of 1.55 or more which has come to appear on the market in recent years, resinous stains are stuck to the lens more firmly and is therefore peeled off with more difficulty as compared with stains of conventional low-refractive index type resins. Also, the amount of the resinous stains is increased and it is more difficult to clean these stains.

The inventors of the present invention have made studies as to a means for securing good corrosion resistance under a high alkali and for stabilizing the composition while the composition is put in a high alkali condition to improve detergency to resinous stains, to complete the present invention.

<Detergent Composition>

(a) Component

The inorganic alkali as the component (a) has the ability to improve the solubility of various resinous stains stuck to a plastic lens molding glass die, penetrability into various resinous stains and the swelling characteristics of various resinous stains and the disintegrating characteristics of various resinous stains based on these characteristics synergically.

Examples of the inorganic alkali as the component (a) include alkali metal hydroxides and alkali metal weak acid salts.

Examples of the alkali metal hydroxides include lithium hydroxide, sodium hydroxide and potassium hydroxide.

Examples of the alkali metal weak acid salts include lithium silicate, lithium carbonate, sodium silicate, sodium carbonate, potassium silicate and potassium carbonate.

The alkali metal hydroxides and alkali metal weak acid salts include those produced as a result of the reaction of compounds formulated as the alkali metal or its metal oxide with water, a weak acid or an aqueous weak acid solution which are compounded in the composition.

Among the component (a), an alkali metal hydroxide is preferable from the viewpoint of improving the conversion of resinous stains into low-molecular materials and the releasability of resinous stains to thereby impart high detergency because the alkali metal hydroxide has high alkalinity. Moreover, sodium hydroxide and potassium hydroxide are more preferable from the viewpoint of availability and from an economical point of view.

The content of the inorganic alkali agent as the component (a) is 2% by weight or more, preferably 4% by weight or more, more preferably 6% by weight or more and even more preferably 8% by weight or more from the viewpoint of improving detergency. Also, the content of the inorganic alkali agent is 30% by weight or less, preferably 28% by weight or less, more preferably 24% by weight or less and even more preferably 20% by weight or less from the viewpoint of handling safety.

Component (b)

At least one surfactant selected from an anionic surfactant and a nonionic surfactant as the component (b) outstandingly improves the conversion of resinous stains stuck to a plastic lens molding glass die into low-molecular materials by decomposition and the releasability of resinous stains, and prevents re-sticking of the released stains, producing the effect of improving detergency markedly when it is combined with the component (a).

In the following, the number of carbons will be abbreviated as, for example, "(C1-18)", when the number of carbons is 1 to 18 if necessary. Also, an abbreviation "POE 1-5" means that an average of 1 to 5 mol of ethylene oxide is added. Also, HLB is calculated based on Griffin's equation.

Examples of the anionic surfactant include carboxylate type anionic surfactants, sulfate type anionic surfactants, sulfonate type anionic surfactants and phosphate type anionic surfactants.

Examples of the nonionic surfactant include polyethylene glycol type nonionic surfactants and polyhydric alcohol type nonionic surfactants.

Among these surfactants, sulfate type anionic surfactants, sulfonate type anionic surfactants and nonionic surfactants having an average HLB value (hydrophilicity-lipophilicity balance) of 4 to 18 are preferable from the viewpoint of the uniformity of the detergent composition when the component (a) is used in a high concentration, detergency and ease of rinsing after cleaning.

Examples of the sulfate type anionic surfactant include alkyl sulfates having a straight-chain or branched alkyl group having 10 to 20 carbon atoms; alkenyl sulfates having an alkenyl group having 10 to 20 carbon atoms; and polyoxyethylenealkyl sulfate having a straight-chain or branched alkyl group having 10 to 20 carbon atoms and a POE of 2 to 25.

Examples of the sulfonate type anionic surfactant include alkyl sulfonates having a straight-chain or branched alkyl group having 10 to 20 carbon atoms; alkenyl sulfonates having an alkenyl group having 10 to 20 carbon atoms; alkylbenzene sulfonates having a straight-chain or branched alkyl group having 8 to 16 carbon atoms; alkylnaphthalene sulfonates having a straight-chain or branched alkyl group having 2 to 6 carbon atoms; alkyl sulfosuccinic acids having a straight-chain, branched or cyclic alkyl group having 10 to 20 carbon atoms; alkenyl sulfosuccinate having an alkenyl group having 10 to 20 carbon atoms; alkyl diphenyl ether disulfonates having a straight-chain or branched alkyl group having 6 to 18 carbon atoms; and alkenyl diphenyl ethers having 6 to 18 carbon atoms.

Examples of the nonionic surfactants having an average HLB of 4 to 18 include (POE 2-37) (C12-14) synthetic alcohol ethers, (POE 1-34) lauryl ethers, (POE 2-46) cetyl ethers, (POE 2-51) stearyl ethers, (POE 2-51) oleyl ethers, (POE 2-38) octyl phenyl ethers and (POE 2-41) nonyl phenyl ethers.

The average HLB of the nonionic surfactant is preferably 4 or more, more preferably 8 or more, even more preferably 10 or more and even more preferably 11 or more from the viewpoint of rinsing characteristics after cleaning and preferably 18 or less, more preferably 15 or less, even more preferably 14 or less and even more preferably 13 or less from the viewpoint of detergency.

Moreover, when the content of the component (a) is 2% by weight or more and particularly 4% by weight or more, sulfate type anionic surfactants and sulfonate type anionic surfactant are more preferable.

Examples of the sulfate type anionic surfactant and sulfonate type anionic surfactant include sodium laurylsulfate, sodium tetradecylsulfate, ammonium laurylsulfate, triethanolamine laurylsulfate; (POE 3-10) sodium lauryl ether sulfate, (POE 3-10) triethanolamine lauryl ether sulfate, (POE 2-10) (C12-13) sodium synthetic alcohol ether sulfate, (POE 20-25) sodium oleyl ether sulfate, (POE 2-10) sodium octylphenol ether sulfate, (POE 4-18) sodium nonylphenol ether sulfate; sodium octylsulfonate, sodium (C10-18)α-olefinsulfonate, sodium dodecylbenzenesulfonate, sodium butylnaphthalenesulfonate; sodium di2-ethylhexylsulfosuccinate, sodium dioctylsulfosuccinate, sodium diisotridecylsulfosuccinate, sodium dicyclohexylsulfosuccinate; sodium octyl diphenyl ether disulfonate and sodium dodecyl diphenyl ether disulfonate. These compounds are all preferable from the viewpoint of improving detergency to resinous stains and durability of detergency and from an economical point of view.

When the detergent composition is a composition containing the component (a) in an amount of 2% or more and particularly 6% or more, the component (b) is more preferably at least one type selected from (POE 3-10) sodium lauryl ether sulfate, (POE 3-10) triethanolamine lauryl ether sulfate, (POE 2-10) (C12-13) sodium synthetic alcohol ether sulfate, (POE 20-25) sodium oleyl ether sulfate, (POE 2-10) sodium octylphenol ether sulfate, (POE 4-18) sodium nonylphenol ether sulfate; sodium octyl diphenyl ether disulfonate and sodium dodecyl diphenyl ether disulfonate.

The content of the surfactant as the component (b) is 0.5% by weight or more, preferably 1.0% by weight or more, more preferably 1.5% by weight or more and even more preferably 2% by weight or more from the viewpoint of detergency. The content of the surfactant is 20% by weight or less, preferably 15% by weight, more preferably 10% by weight or less and even more preferably 5% by weight or less from the viewpoint of the handling characteristics, for example, a rise in the viscosity of the detergent when the detergent is used.

Component (c)

The calcium salt as the component (c) prevents a molding glass die from being corroded by the component (a) and serves to improve the effect of improving the effect of a combination of the components (a) and (b).

Examples of the component (c) include inorganic calcium salts and organic calcium salts, which may be used either independently or in combinations of two or more.

Examples of the inorganic calcium salt include calcium hydroxide, calcium chloride, calcium nitrate, calcium nitrite, calcium hypophosphite, calcium phosphate, calcium pyrophosphate, calcium tripolyphosphate and calcium polyphosphate.

The component (c) may be one produced as an inorganic acid calcium salt such as calcium hydroxide or calcium carbonate by compounding a metal calcium or calcium oxide in the detergent composition and by reacting the calcium salt with water, an inorganic acid salt and the like.

Examples of the organic calcium salt include calcium straight-chain alkylcarboxylates, calcium alkylenecarboxylates, aromatic calcium carboxylates, calcium oxycarboxylates, calcium polyvalent carboxylates, calcium aminocarboxylates, organic calcium sulfates, organic calcium sulfonates and organic calcium phosphates.

Examples of the calcium straight-chain alkylcarboxylate and calcium alkylenecarboxylate include calcium formate, calcium acetate and calcium propionate.

Examples of the aromatic calcium carboxylate include calcium benzoate, calcium m-hydroxybenzoate, calcium p-hydroxybenzoate, calcium 2,3-dihydroxybenzoate, calcium 2,5-dihydroxybenzoate, calcium α-resorcylate, calcium β-resorcylate, calcium γ-resorcylate, calcium protocatechuic acid salt, calcium gallate and calcium benzylate.

Examples of the calcium oxycarboxylate include calcium glyoxylate, calcium glycolate, calcium lactate, calcium gluconate, calcium tartronate, calcium malate, calcium tartarate, calcium citrate and calcium mucinate.

Examples of the polyvalent carboxylate include calcium oxalate and calcium L-aspartate.

Examples of the calcium aminocarboxylate include calcium pantothenate, calcium ethylenediaminetetraacetate, calcium N-hydroxyethylenediamine-N,N',N'-triacetate, calcium diethylenetriaminepentaacetate, calcium nitrilotriacetate, calcium triethylenehexaminetetraacetate, calcium trans-1,2-cyclohexanediaminetetraacetate, calcium hydroxyethyliminodiacetate and N,N-di(2-hydroxyethyl)glycine calcium.

Examples of the organic calcium sulfate include calcium alkylsulfate, calcium polyoxyethylene alkyl ether sulfate and calcium polyoxyethylene alkyl phenyl ether sulfate.

Examples of the organic calcium sulfonate include calcium alkylbenzenesulfonate, calcium alkylnaphthalenesulfonate, calciumdialkylsulfosuccinate, calcium alkyl diphenyl ether disulfonate and calcium salts of a β-naphthalenesulfonic acid-formaldehyde condensate.

Examples of the organic calcium phosphate include calcium glycerophosphate, calcium aminotri(methylenephosphonate), calcium 1-hydroxyethylidene-1,1-diphosphonate, calcium ethylenediaminetetra(methylenephosphonate) and calcium diethylenetriaminepenta(methylenephosphonate).

The component (c) is more preferably one type selected from calcium chloride, calcium nitrate, calcium hypophosphite, calcium propionate, calcium benzoate, calcium lactate, calcium gluconate, calcium pantothenate and calcium glycerophosphate from the viewpoint of uniformity of the detergent composition and prevention of corrosion of glass because the detergent composition of the present invention contains the component (a) in an amount of 2% by weight or more.

The content (based on calcium ion) of the component (c) is 0.01% by weight or more, preferably 0.02% by weight or more, more preferably 0.036% by weight or more and even more preferably 0.055% by weight or more from the viewpoint of preventing corrosion of glass. The content of the component (c) is 2% by weight or less, preferably 1% by weight or less, more preferably 0.5% by weight or less and even more preferably 0.2% by weight or less from the viewpoint of uniformity of a product and from the viewpoint of maintaining the quality of the surface of glass.

Component (d)

The calcium ion-sequestering agent as the component (d) not only serves to maintain the detergency of the composition and to produce the effect of preventing glass from being corroded, but also improves mutual solubility and uniformity of a product when the components (a), (b) (c) and water as the component (f) are compounded.

Here, the calcium ion-sequestering agent means compounds having a chelate stability constant $\log K_{ca}$ of 1 to 14 as to a chelate of the agent and calcium. The chelate stability constant $\log K_{ca}$ is measured in the following method.

(1) First, an aqueous calcium ion standard solution (aqueous solution for a calibration curve) is prepared in the following manner. Specifically, using calcium chloride dihydrate, aqueous solutions containing a $Ca^{2+}$ ion in amounts of 0.01 mol/L, 0.001 mol/L and 0.0001 mol/L are respectively prepared in an amount of 50 mL and adjusted to pH 9 to 11 by using an aqueous 4.8% sodium hydroxide solution, to which 1 mL of an aqueous 4 mol/L potassium chloride solution is then added.

(2) Next, an aqueous solution of the sample to be measured is prepared. Specifically, a calcium ion-sequestering agent weighing 10 mg based on solid content is poured into a 100 mL beaker, to which 50 mL of an aqueous 0.001 mol/L calcium ion solution prepared using calcium chloride dihydrate is then added. The mixture is stirred uniformly using a stirrer and adjusted to pH 9 to 11 by adding an aqueous 4.8% sodium hydroxide solution, and 1 mL of an aqueous 4 mol/L potassium chloride solution is added to the mixture.

(3) The chelate stability constant $\log K_{ca}$ is measured by a calcium ion electrode 9302 by Olion Corp. Ltd in Ion Analyzer EA 920 manufactured by Olion. Ltd.

(4) The amount of calcium ions trapped by the sample is found from the calibration curve and measured data of the sample and the amount of calcium ions per 1 g of the solid of the calcium ion-sequestering agent is expressed by the amount mg based on calcium carbide as the value representing the calcium ion-sequestering ability.

(5) Using the value representing the calcium ion-sequestering ability found by the measurement, the chelate stability constant $\log K_{ca}$ is calculated according to the following equation which is described in "Muraji Shibata, Complex Chemistry Handbook, Kyoritsu Shuppan (1963)" or "Kagehira Ueno, Chelate Chemistry handbook, Nankodo (1969)"

$$[Ca^{2+}] + [L] \leftrightharpoons [CaL] \quad (.1)$$

$$K_{ca} = \frac{[CaL]}{[Ca^{2+}][L]} \quad (.2)$$

With regard to the "chelate stability constant $\log K_{ca}$" used in the present invention, specific values of the chelate stability constant are described in many documents translated by Mitio Kobayashi, Masatoshi Fujimoto, Kunihiko Mizuno, Metal Chelate Compound, Kyoritsu Shuppan Co., Ltd., (1960), R. M. Smith and A. E. Martell, Critical Stability Constants, Vol. 2, Plenum Press, New York, (1975), L. G. Sillen and A. E. Martell, Stability Constants of Metal-Ion Complexes, Supplement No. 1, Special Publication No. 25, The chemical Society, Burlington House, London, (1971), p. 273.

Examples of the component (d) include oxycarboxylic acid and its salt, carboxylic acid or polyvalent carboxylic acid and its salt, aromatic carboxylic acid and its salt, aminocarboxylic acid and its salt, phosphonic acid and its salt, phosphoric acid and its salt, hydroxybenzene, polyhydric alcohols, aminonaphtholsulfonic acid and its salt and triethanolamine. The above calcium ion-sequestering agents may be used either singly or in combinations of two or more.

Examples of the oxycarboxylic acid and it salt include glyoxylic acid, glycolic acid, lactic acid, gluconic acid, mandelic acid, tartronic acid, malic acid, tartaric acid, citric acid and mucic acid and alkali metal or lower amine salts of these acids.

Examples of the carboxylic acid or polyvalent carboxylic acid and its salt include oxalic acid, malonic acid, succinic acid, glutaric acid, adipic acid, pimelic acid, fumaric acid, maleic acid, diglycolic acid and L-aspartate, and alkali metal or lower amine salts of these acids.

Examples of the aromatic carboxylic acid and its salt include m-hydroxybenzoic acid, p-hydroxybenzoic acid, 2,3-dihydroxybenzoic acid, 2,5-dihydroxybenzoic acid, α-resorcic acid, β-resorcic acid, γ-resorcic acid, protocatechuic acid, gallic acid, tannic acid, 3,5-dinitrosalycilic and salicylic acid, and alkali metal or lower amine salts of these acids.

Examples of the aminocarboxylic acid and its salt include ethylenediaminetetraacetic acid, ethylenediaminediacetic acid, nitrilotriacetic acid, N-hydroxyethylenediamine-N,N', N'-triacetic acid, diethylenetriaminepentaacetic acid, triethylenetetraminehexaacetic acid, tetraethylentetraminehexaacetic acid, hydroxyethyliminodiacetic acid, N,N-di(2-hydroxyethyl)glycine, iminodiacetic acid and trans-1,2-cyclohexanediaminetetraacetic acid, and alkali metal or lower amine salts of these acids.

Examples of the phosphonic acid and its salt include aminotri(methylenephosphonic acid), 1-hydroxyethylidene-1,1-diphosphonic acid, ethylenediaminetetra(methylenephosphonic acid) and diethylenetriaminepenta(methylenephosphonic acid), and alkali metal or lower amine salts of these acids.

Examples of the phosphoric acid and its salt include potassium pyrophosphoric acid, potassium tripolyphosphoric acid and potassium polyphosphoric acid.

Examples of the hydroxybenzene include 2-hydroxyphenol, 3-hydroxyphenol, 2,3-dihydroxyphenol (pyrogallol), 3,5-dihydroxyphenol, hexahydroxycyclohexane and aminonaphthol.

Examples of the polyhydric alcohol include D-sorbitol, D-mannitol, dulcitol, D-arabinose, xylitol, gluconolactone, D-mannose, D-galactose and threitol.

The component (d) is more preferably one or more types selected from lactic acid, gluconic acid, tartaric acid, citric acid, oxalic acid, maleic acid, gallic acid, ethylenediaminetetraacetic acid, nitrilotriacetic acid, aminotri(methylenephosphonic acid) and 1-hydroxyethylidene-1,1-diphosphonic acid and alkali metal or lower alkyl amine salts of these acids from the viewpoint of uniformity of the detergent composition and prevention of corrosion of glass because the detergent composition of the present invention contains the component (a) in an amount of 2% by weight or more.

The content of the component (d) is 0.1% by weight or more, preferably 0.3% by weight or more, more preferably 0.5% by weight or more and even more preferably 0.8% by weight or more from the viewpoint of detergency and compatibility with the components (a), (b), (c) and (f) Also, the content of the component (d) is 15% by weight or less, preferably 10% by weight or less, more preferably 5% by weight or less and even more preferably 3% by weight or less from the viewpoint of the effect of preventing corrosion of glass and handling easiness during cleaning.

If a combination of a calcium ion-sequestering agent ($d_1$) having a chelate stability constant log $K_{ca}$ of 1 to 4 and a calcium ion-sequestering agent ($d_2$) having a chelate stability constant log $K_{ca}$ of 5 to 13 is used in the component (d), a better effect is obtained from the viewpoint of preserving stability and the effect of preventing corrosion of glass because the detergent composition contains the component (a) in a high concentration. When these sequestering agents are combined, the ratio ($d_1/d_2$: weight ratio) of ($d_1$) to ($d_2$) is 98/2 to 50/50, preferably 95/5 to 60/40, more preferably 90/10 to 65/35 and even more preferably 85/15 to 70/30.

The component (d) is preferably a combination of compounds selected from oxycarboxylic acid and its salt, aminocarboxylic acid and its salt and organic phosphonic acid and its salt as a material which has highly soluble in water and produces an excellent calcium ion-sequestering effect even when the component (a) is contained in an amount of 2% by weight or more.

Component (e)

The water-soluble organic solvent (e) works to improve detergency, rinsing ability after cleaning and compatibility with other components such as water when these other components are compounded.

As the component (e), an alcohol, an ether, an acetal, a ketone, an aldehyde, a polyhydric alcohol, a nitrogen-containing compound or an alkylene oxide compound, which can be dissolved in an amount 20 g or more in 100 g of water at 25° C., is preferable. Specific examples of the component (e) include compounds shown below.

(1) Alcohols such as methyl alcohol, ethyl alcohol, 1-propyl alcohol, isopropyl alcohol, t-butyl alcohol, allyl alcohol, furfuryl alcohol and tetrahydrofurfuryl alcohol.

(2) Ethers and acetals such as dimethyl ether, dipropyl ether and tetrahydrofuran.

(3) Ketone and aldehydes such as acetaldehyde, acetone, diacetone alcohol and methyl ethyl ketone.

(4) Polyhydric alcohols such as ethylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, propyleneglycol, dipropylene glycol, tripropylene glycol, trimethylene glycol, 1,3-octylene glycol, 1,2-propanediol, 1,3-propanediol, 2-methyl-1,3-propanediol, 1,2-butanediol, 1,3-butanediol, 1,4-butanediol, 1,4-butenediol, 1,4-pentanediol, 1,5-pentanediol, 1,5-hexanediol, 1,6-hexanediol, glycerin, trimethylol ethane and trimethylol propane.

(5) Nitrogen-containing compounds such as acetamide, N,N-dimethylacetamide, acetonitrile, amylamine, allylamine, isobutylamine, isopropanolamine, isopropylamine, N-ethylethanolamine, morpholine, N-ethylmorpholine, ethylenediamine, caprolactam, diamylamine, diethanolamine, diethylamine, diethylenetriamine, cyclohexylamine, dimethylamine, tetraethylenepentamine, N,N,N',N'-tetramethylethylenediamine, triethanolamine, 2-pyrrolidone, N-methylpyrrolidone, N-methylformamide, monoethanolamine, monomethylamine and monoethylamine.

(6) Alkylene oxide compounds including alkylene oxide compounds A represented by the formula (I):

$$R^1—O—(R^2—O)m-R^3 \qquad (I)$$

In the formula, $R^1$ represents a hydrocarbon group having 1 to 8 carbon atoms, $R^2$ represents an ethylene group, $R^3$ represents a hydrogen atom, an alkyl group having 1 to 4 carbon atoms, m is an average mole number of added ($R^2$—

O) and a number of 1 to 7 and alkylene oxide compounds B represented by the formula (II):

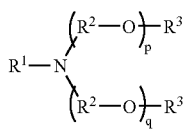

(II)

In the formula, $R^1$, $R^2$ and $R^3$ are the same as above, p is an average mole number of added ($R^2$—O) and a number of 1 to 5 and q is an average mole number of added ($R^2$—O) and 0 or a number of 1 to 5.

In the alkylene oxide compounds represented by the formula (I) or (II), $R^1$ that is a hydrocarbon group having 1 to 8 carbon atoms is preferably a hydrocarbon group having 1 to 4 carbon atoms from the viewpoint of securing the uniformity of the detergent composition in a wide temperature range.

When $R^1$ is not a hydrocarbon group having 1 to 8 carbon atoms, there is the case where the uniformity of the detergent composition cannot be secured.

Examples of the hydrocarbon group having 1 to 8 carbon atoms include straight-chain saturated hydrocarbon groups such as a methyl group, ethyl group, propyl group, butyl group, pentyl group, hexyl group, heptyl group and octyl group; branched saturated hydrocarbon groups such as an isopropyl group, isobutyl group and t-butyl group; straight-chain unsaturated hydrocarbon groups such as a vinyl group, allyl group, propenyl group, butenyl group, pentenyl group, hexenyl group, heptenyl group and octenyl group; branched unsaturated hydrocarbon groups such as isopropenyl group; cyclic saturated hydrocarbon groups such as a cyclopropyl group, cyclobutyl group, cyclopentyl group, cyclohexyl group, cycloheptyl group and cyclooctyl group; cyclic unsaturated hydrocarbon groups such as a cyclopropenyl group, cyclobutenyl group, cyclopentenyl group, cyclohexenyl group, cycloheptenyl group and cyclooctenyl group; and aromatic hydrocarbon groups such as a phenyl group, benzyl group and phenethyl group.

$R^2$ is an ethylene group. When the number of carbons is 1, it is difficult to produce the aforementioned alkylene oxide compound and when the number of carbons is 3 or more, water-solubility is poor and there is therefore the case where the uniformity of the detergent composition is reduced.

$R^3$ represents a hydrogen atom or an alkyl group having 1 to 4 carbon atoms. When the number of carbons exceed 4, the uniformity of the detergent composition is decreased. Examples of the alkyl group having 1 to 4 carbon atoms include a methyl group, ethyl group, propyl group and butyl group.

Also, m is a number of 1 to 7, p is a number of 1 to 5, q is a number of 0 or a number of 1 to 5. Here, q may be 0. Therefore, p+q is a number of 1 to 10. m is preferably a number of 2 to 7 and more preferably a number of 2 to 4 from the view point of solubility in water and the uniformity of the detergent composition. From the same viewpoint, p+q is preferably a number of 1 to 8 and more preferably a number of 2 to 6.

These alkylene oxide compounds represented by the formula (I) or (II) may be used either singly or in combinations of two or more in general.

Examples of the alkylene oxide compound A represented by the formula (I) include compounds obtained by adding an alkylene (e.g., ethylene, propylene and butylene) oxide having 2 to 4 carbon atoms either singly or plurally in a liquid or gas state to alcohols having a straight-chain or branched chain such as methanol, ethanol, propanol, butanol, isobutanol, hexanol and octanol; phenols such as phenol and cresol; or alicyclic alcohols such as cyclohexanol and by reacting the both under heating in the presence of a catalyst such as caustic soda, and also, compounds obtained by methylating, ethylating or butylating the terminal hydroxyl group of these alkylene oxide adducts by an alkyl chloride and compounds obtained by esterifying the terminal hydroxyl group of these alkylene oxide adducts by acetic acid or propionic acid.

Examples of the alkylene oxide compound A represented by the formula (I) include ethylene glycol monoethers such as a (POE 1-7) monomethyl ether, (POE 1-7) monoethyl ether, (POE 1-7) monopropyl ether, (POE 1-7) monobutyl ether, (POE 1-7) monoisobutyl ether, (POE 1-7) monoallyl ether, (POE 1-7) monohexyl ether, (POE 1-7) mono-2-ethylhexyl ether, (POE 1-7) monooctyl ether, (POE 4-7) monophenyl ether and (POE 4-7) monobenzyl ether; and ethylene glycol diethers such as (POE 2-7) dimethyl ether, (POE 2-7) diethyl ether, (POE 2-7) dipropyl ether, (POE 3-7) dibutyl ether, (POE 3-7) diisobutyl ether, (POE 3-7) diallyl ether, (POE 4-7) dihexyl ether, (POE 4-7) di2-ethylhexyl ether, (POE 4-7) dioctyl ether, (POE 4-7) diphenyl ether, (POE 4-7) dibenzyl ether, (POE 2-7) ethyl methyl ether, (POE 3-7) butyl methyl ether and (POE 3-7) 2-ethylhexyl methyl ether.

Among these compounds, a (POE 1-5) monomethyl ether, (POE 1-5) monoethyl ether, (POE 1-5) monopropyl ether, (POE 1-5) monobutyl ether, (POE 1-2) monoisobutyl ether, (POE 1-2) monoallyl ether, (POE 1-2) monohexyl ether, (POE 1-2) mono2-ethylhexyl ether, (POE 4-5) monophenyl ether, (POE 4-5) monobenzyl ether; (POE 1-4) dimethyl ether, (POE 1-2) diethyl ether, (POE 1-2) dipropyl ether, (POE 1-2) dibutyl ether, (POE 2) ethyl methyl ether, (POE 2) butyl methyl ether and (POE 2) 2-ethylhexyl methyl ether.

These alkylene oxide compounds A may be use either singly or in combinations of two or more.

Examples of the alkylene oxide compound B represented by the formula (II) include compounds synthesized by using amines having a straight-chain, branched chain, aromatic or alicyclic hydrocarbon group as a raw material such as ethylamine, diethylamine, hexylamine, butylamine, octylamine, benzylamine and cyclohexylamine in the same manner as in the case of the compounds represented by the formula (I).

Examples of the alkylene oxide compound B represented by the formula (II) include glycol monoamines such as a (POE 1-7) ethylamine, (POE 1-7) diethylamine, (POE 1-7) hexylamine, (POE 1-7) butylamine, (POE 1-7) octylamine, (POE 1-7) benzylamine and (POE 1-7) cyclohexylamine.

Among these compounds, a (POE 1-5) monoethylamine, (POE 1-5) diethylamine, (POE 1-5) hexylamine, (POE 1-5) butylamine, (POE 1-5) octylamine, (POE 1-5) benzylamine and (POE 1-5) cyclohexylamine from the viewpoint of the uniformity of the detergent composition and availability.

These alkylene oxide compounds B may be used either singly or in combinations of two or more.

The alkylene oxide compound A represented by the formula (I) can be preferably used in the present invention from the viewpoint of the uniformity of the detergent composition.

The component (e) is those having a solubility parameter of preferably 21.5 to 31 $J^{1/2} \cdot cm^{-3/2}$, more preferably 23 to 30 $J^{1/2} \cdot cm^{-3/2}$, even more preferably 24.5 to 29 $J^{1/2} \cdot cm^{-3/2}$ and even more preferably 25.5 to 28 $J^{1/2} \cdot cm^{-3/2}$. The component (e) is more preferably those having a solubility parameter of 24.5 $J^{1/2} \cdot cm^{-3/2}$ or more from the viewpoint of preserving stability at high temperatures and even more preferably those having a solubility parameter of 29 $J^{1/2} \cdot cm^{-3/2}$ or less from the viewpoint of preserving stability at low temperatures.

The solubility parameter δ of a molecule of a compound can be determined with the following equation:

$$\delta = (\delta_d^2 + \delta_p^2 + \delta_h^2)^{1/2}$$

In the equation, $\delta_d$ is a member for London dispersion power; $\delta_p$ is a member for the molecular polarization; $\delta_h$ is a member for hydrogen bond.

The members are calculated with the following equations, respectively, which include mole affinity multiplier ($F_{di}$, $F_{pi}$, $E_{hi}$) of each member of a constituting atom group i of the molecule and a mole volume $V_i$.

$$\delta_d^2 = \Sigma F_{di}/\Sigma V_i$$

$$\delta_p^2 = (\Sigma F_{pi}^2)^{1/2}/\Sigma V_i$$

$$\delta_h^2 = (\Sigma E_{hi}/\Sigma V_i)^{1/2}$$

Values of the mole affinity multiplier ($F_{di}$, $F_{pi}$, $E_{hi}$) of each member of a constituting atom group i of the molecule and a mole volume $V_i$ are listed in the Table below shown. In constituting atom groups not cited here, Van Krevelen values, shown in Literatures A and B, can be used for the mole affinity multiplier ($F_{di}$, $F_{pi}$, $E_{hi}$) of each member and Fedors values, shown in Literature C, can be used for the mole volume $V_i$.

Literature A: K. E. Meusburger: "Pesticide Formulations Innovations and Developments" Chapter 14 (Am. Chem. Soc.), 151-162(1988)

Literature B: A. F. M. Barton: "Handbook of Solubility Parameters and Other Cohesion Parameters" (CRC Press Inc., Boca Raton, Fla.) (1983)

Literature C: R. F. Fedors: Polymer Eng. Sci., 14, (2), 147-154 (1974)

Table for calculation of solubility parameter

| Structural Group | Fdi | Fpi | Ehi | Vi |
|---|---|---|---|---|
| —CH3— | 420 | 0 | 0 | 31.7 |
| —CH2— | 270 | 0 | 0 | 16.1 |
| >CH— | 80 | 0 | 0 | −1.0 |
| >C< | −70 | 0 | 0 | −19.2 |
| =CH2 | 403 | 94 | 143 | 28.5 |
| =CH— | 223 | 70 | 143 | 13.5 |
| =C< | 70 | 0 | 0 | −5.5 |
| —C6H11 | 1620 | 0 | 0 | 95.5 |
| —C6H5 | 1499 | 110 | 205 | 75.4 |
| —C6H4-(o,m,p) | 1319 | 110 | 205 | 60.4 |
| —F | 221 | 542 | | 18.0 |
| —F (Disubstituted, CF2) | 221 | 542 | | 20.0 |
| F (Trisubstituted, —CF3) | 221 | 542 | | 22.0 |
| —Cl | 450 | 550 | 400 | 24.0 |
| —Cl (Disubstituted, CCl2) | 450 | 550 | 400 | 26.0 |
| —Cl (Trisubstituted, —CCl3) | 450 | 550 | 400 | 27.3 |
| —Br | 550 | 614 | 1023 | 29.0 |
| —Br (Disubstituted, CBr2) | 550 | 614 | 1023 | 31.0 |
| —Br(Trisubstituted, —CBr3) | 550 | 614 | 1023 | 32.0 |
| —I | 655 | 655 | 2046 | 32.2 |
| —CN | 430 | 1100 | 2500 | 24.0 |
| —OH | 210 | 500 | 20000 | 10.0 |
| —OH (disubstituted or on the adjacent carbon) | 210 | 500 | 20000 | 13.0 |
| —O— | 235 | 409 | 2352 | 3.8 |
| —COH(aldehyde) | 470 | 800 | 4500 | 22.3 |
| >C=O | 290 | 770 | 2000 | 10.5 |
| —COOH | 530 | 420 | 10000 | 28.5 |
| —COO-(ester) | 390 | 490 | 7000 | 18.0 |
| HCOO-(formate) | 530 | | | 32.5 |
| —CO—O—CO-(anhydride) | 675 | 1105 | 4838 | 30.0 |
| —NH2 | 280 | 419 | 8400 | 17.9 |
| —NH— | 160 | 210 | 3100 | 4.5 |
| >N— | 20 | 800 | 5000 | −9.0 |
| —NO2(aliphatic) | 500 | 1070 | 1500 | 24.0 |
| —NO2(aromatic) | 500 | 1070 | 1500 | 32.0 |
| >Si—O— | 266 | 307 | 921 | 3.8 |
| —S-(sulfide) | 440 | | | 12.0 |
| =PO4-(phosphate) | 740 | 1890 | 6352 | 28.0 |
| Ring (5-or more-membered ring) | 190 | | | 13.5 |
| Ring (3- or 4-membered ring) | 190 | | | 18.0 |

The component (e) is more preferably (e-1) polyhydric alcohols, (e-2) nitrogen-containing compounds and (e-3) alkylene oxide compounds as those developing the uniformity and excellent rinsing characteristics (rinsing ability) of the detergent composition.

(e-1), (e-2) or (e-3) is preferably at least one type selected from the group constituted of compounds described below:

(e-1) diethylene glycol, triethylene glycol, tetraethylene glycol, pentaethylene glycol, hexaethylene glycol, heptaethylene glycol, octaethylene glycol, nonaethylene glycol, decaethylene glycol, propylene glycol, dipropylene glycol, tripropylene glycol and trimethylene glycol;

(e-2) acetamide, N,N-dimethylacetamide, acetonitrile, amylamine, allylamine, isobutylamine, isopropanolamine, isopropylamine, N-ethylethanol amine, morpholine, N-ethylmorpholine, ethylenediamine, caprolactam, diamylamine, diethanolamine, diethylamine, diethylenetriamine, cyclohexylamine, dimethylamine, tetraethylenepentamine, N,N,N',N'-tetramethylethylenediamine, triethanolamine, 2-pyrrolidone, N-methylpyrrolidone, N-methylformamide, monoethanolamine, monomethylamine and monoethylamine; and (e-3) (POE 1-5) monomethyl ether, (POE 1-5) monoethyl ether, (POE 1-5) monopropyl ether, (POE 1-5) monobutyl ether, (POE 1-2) monoisobutyl ether and (POE 1-2) monoallyl ether.

The polyhydric alcohols (e-1) are even more preferably triethylene glycol, tetraethylene glycol, heptaethylene glycol, hexaethylene glycol, nonaethylene glycol, dipropylene glycol and tripropylene glycol.

The nitrogen-containing compounds (e-2) are even more preferably N,N-dimethylacetamide or morpholine.

The alkylene oxide compounds (e-3) are even more preferably a (POE 1-5) monomethyl ether, (POE 1-5) monoethyl ether and (POE 1-5) monopropyl ether.

The alkylene oxide compounds (e-3) are even more preferably polyhydric alcohols and nitrogen-containing compounds and even more preferably polyhydric alcohols.

The content of the component (e) is preferably 1% by weight or more, more preferably 2% by weight or more, even more preferably 3% by weight or more and even more preferably 5% by weight or more from the viewpoint of improving rinsing characteristics after cleaning and compatibility with other components such as water even when the component (a) is contained in an amount of 2% by weight. Also, the content of the component (e) is preferably 30% by weight or less, more preferably 25% by weight or less, even more preferably 20% by weight or less and even more preferably 18% by weight or less from the viewpoint of detergency.

(f) Water

Water as the component (f) is used as a solvent that dissolves the components (a) to (e) uniformly and as a solvent that promotes the alkali action of the component (a).

Any type of water may be used insofar as it is not a hindrance to the purpose of the detergent composition of the present invention. Examples of the component (f) include ultra pure water, pure water, ion exchange water, distilled water and usual city water.

The content of the component (f) is 20% by weight or more, preferably 30% by weight or more, more preferably 40% by weight or more, even more preferably 40% by weight or more and even more preferably 50% by weight or more from the viewpoint of improving compatibility with each component of the detergent composition of the present invention when these components are compounded and helping the component (a) to develop the effect of releasing resinous stains. Also, the content of the component (f) is 95% by weight or less, preferably 90% by weight or less, more preferably 85% by weight or less and even more preferably 80% by weight or less from the viewpoint of developing high detergency.

The detergent composition of the present invention may be produced by mixing the components (a) to (f) by a usual method. The components listed as examples of the components (a) to (f) can solve the problem of the present invention even if any one of them is used. However, there is a difference in effect between components to be used.

The detergent composition of the present invention may be compounded of an antiseptic, rust preventive, anti-foaming agent such as silicone, antioxidant and the like according to the need to the extent that the effect of the present invention is not impaired.

The detergent composition of the present invention is suitable for cleaning high-molecular weight resinous stains such as plastic lens molding raw materials, unreacted monomers, oligomers, polymers (resins), components bleeding out from gaskets, plasticizers, adhesives and removable adhesives derived from mold fixing tapes and stains such as fingerprints of operators and dusts in the atmosphere. In the case where high-molecular weight resinous stains such as a polymer (resin) and removable adhesive can be removed, other stains can be removed in consideration of the strength of sticking of stains.

The detergent composition of the present invention has high detergency to various resinous stains, possesses the nature resistant to corrosion of a plastic lens molding glass die and is a composition highly safe to the human body, so that it is possible to carry out a safe cleaning operation.

<Cleaning Method>

Next, the cleaning method of the present invention will be explained.

A cleaning step (A) is a step of cleaning a plastic lens molding glass die by using the detergent composition of the present invention.

No particular limitation is imposed on the method of cleaning a plastic lens molding glass die by using the detergent composition and as this method, a usually used known method may be used. Examples of such a cleaning method include cleaning methods such as a dipping method, dipping-fluctuating method, ultrasonic cleaning method, spraying method and hand-wiping method. Also, there is no particular limitation to the cleaning condition such as the temperature and cleaning time of the detergent composition.

A rinsing step (B) is a step of rinsing the molding glass die cleaned in the cleaning step (A) with water.

Any water may be used as the rinsing water without any particular limitation insofar as it can remove stains left on the surface of the molding glass die. For example, ultra pure water, pure water, ion exchange water, distilled water and city water which may be heated according to the need are preferable from the viewpoint of ease of rinsing easiness. Also, no particular limitation is imposed on the rinsing method and the same method as that used in the step (A) may be used. Also, no particular limitation is imposed on the rinsing condition.

Explanations will be furnished as to embodiments of the cleaning method in the case of applying a dipping method, dipping fluctuating method or ultrasonic cleaning method is applied. In each cleaning method, cleaning and rinsing may be repeated plurally corresponding to the degree of stains.

(Dipping Method)

A plastic lens molding glass die is wholly dipped in a container in which the detergent composition (content of water: 50% by weight, liquid temperature: ambient temperature (preferably 20° C.) to 70° C.) of the present invention is placed and allowed to stand in this condition for 0.5 to 3 hours. After the glass die is taken out, it is rinsed with a water stream (water temperature: ambient temperature (preferably 20° C.) to 50° C.) for 1 to 2 minutes.

(Dipping and Fluctuating Method)

A plastic lens molding glass die is wholly dipped in a container in which the detergent composition (content of water: 60% by weight, liquid temperature: ambient temperature (preferably 20° C.) to 70° C.) of the present invention is placed. In this condition, the detergent composition is stirred by a stirrer in the condition of a circulating rate of 5 to 20 L/min. (100 L vessel) for 0.5 to 3 hours either continuously or intermittently. After the glass die is taken out, it is rinsed with a water stream (water temperature: ambient temperature (preferably 20° C.) to 50° C.) for 1 to 2 minutes.

(Ultrasonic Cleaning Method)

A plastic lens molding glass die is perfectly dipped in an ultrasonic cleaner in which the detergent composition (content of water: 70% by weight, liquid temperature: ambient temperature (preferably 20° C. to 70° C.) of the present invention is placed. In this condition, ultrasonic cleaning is carried out at 26 to 40 kHz (10 to 30 W/L) for 20 to 300 seconds. After the glass die is taken out, it is rinsed in the ultrasonic cleaner in the same condition as above for 200 to 300 seconds.

The cleaning method using the detergent composition of the present invention has high detergency to high-molecular weight resinous stains, can clean various resinous stains without corroding a molding glass die and is also superior in safety to the human body during cleaning.

EXAMPLES

The Examples are set forth for more illustration of the present invention, and not intended to limit the present invention.

Production Example (Test Piece)

(1) Preparation of Diethylene Glycol Bisallyl Carbonate (ADC) Resinous Stains (Including Unreacted Monomers to Oligomers)

A 4.7 mm×75.4 mm×26.0 mm hole slide glass (manufactured by Iuchi Seieido Co., Ltd.) having three holes and made of glass was prepared, the slide glass having three watch glass cavities having a diameter of 20 mm and a maximum depth of 2 mm.

100 parts by weight of ADC (trade name: CR-39 Monomer, manufactured by PPG) as a monomer and 11 parts by weight of diisopropyl peroxydicarbonate (trade name: PEROYL IPP-27 (CR), manufactured by Nippon Oil and Fats Co., Ltd.) as an initiator were stirred at a low temperature (−10 to 10° C.) until a uniform composition was obtained, to obtain a mixture.

The resulting mixture was poured in an amount of 0.22 mL in each cavity such that it had the same level as the upper surface of the slide glass, so that the amount of the resin per one hole slide glass with three holes was 0.66 mL, to obtain a polymer having a uniform shape.

This hole slide glass with three holes was put in a stainless lidded tray, the atmosphere in the tray was replaced with nitrogen gas and then the tray was perfectly sealed. Thereafter, the resin was polymerized and solidified by heating it at 40° C. for 2 hours, at 60° C. for 2 hours and at 80° C. for 18 hours, to obtain a test piece to be subjected to a test for cleaning ADS resinous stains.

(2) Molding glass die with a resinous stain by sulfur-containing urethane resin (containing unreacted monomers to oligomers) stuck thereto five lumps of MR-8 resin (sulfur-containing urethane resin manufactured by Mitsui Chemical Co., Ltd., refractive index: 1.60) about 1 cm in diameter were molded (0.05 g/1 cm diameter per lump) on the working side of an about 8-cm-dia molding glass die that was chemically reinforced by potassium nitrate. These lumps of MR-8 resin were heated in the condition of the polymerization of a plastic lens resin in the following condition for 24 hours in total: at 30° C. for 6 hours, at 40° C. for 7 hours, at 50° C. for 3 hours, at 60° C. for 2 hours, at 100° C. for 3 hours and at 120° C. for 3 hours, to polymerize and solidify these resin lumps.

(3) Production of a Test Piece of Glass Corrosion Test

A slide glass (S-1112, trademark of Matsunami Glass Kogyo K.K.) having a size of 1.1 mm×76.0 mm×26.0 mm and made of alkali silicate glass (composition: 70% $SiO_2$, 12% $Na_2O$, 6.5% CaO, 4% $K_2O$, 4% ZnO, 1% MgO, 1% BaO, 1% $Al_2O_3$, 0.5% $TiO_2$) was dipped in a potassium nitrate molten salt kept at 410 to 430° C. for 12 hours. After that, the molten salt was cooled to ambient temperature and the slide glass was washed in a water stream to wash away potassium nitrate. The slide glass was thoroughly drained and dried in air to prepare a chemically reinforced glass test piece for glass corrosion test.

Examples 1 to 12 and Comparative Examples 1 to 13

Various detergent compositions each having the percentage composition (unit of the ratio of the composition: % by weight) shown in Tables 1 and 3 were prepared. These detergent compositions were respectively used to make a detergency test for cleaning ADC resinous stains and sulfur-containing urethane resinous stains and a glass corrosion test. The results of the test for the compositions shown in Table 1 are shown in Table 2 and the results of the test for the compositions shown in Table 3 are shown in Table 4. The methods of the detergency test and glass corrosion test and the evaluation standards of these tests are shown below.

(Detergency Test)

Cleaning Step (A)

A test piece to make a detergency test for cleaning ADC resinous stains and sulfur-containing urethane resinous stains was dipped in a detergent composition kept at 60° C. to carry out cleaning using an ultrasonic cleaner (trade name: SILENTSONIC UT-204, manufactured by Sharp Corporation) in the condition of 39 kHz and 200 W for 60 seconds.

Rinsing Step (B)

Then, the test piece was dipped in 30° C. ion exchange water and rinsed in an ultrasonic cleaner similar to that used in the cleaning for 50 seconds (first rinse). Further, the test piece was likewise dipped in 30° C. ion exchange water and rinsed for finish in an ultrasonic cleaner (second rinse). Then, the test piece was dried by air blowing and dried by a blowing constant-temperature drier (trade name: FV-630, manufactured by Toyo Seisakusho Co., Ltd.) at 80° C. for 10 minutes.

Five test pieces for ADC resinous stains and sulfur-containing urethane resinous stains were cleaned by each detergent composition in the above condition, to find the detergency of each detergent composition to the resinous stains from a change in the weight of the test piece before and after cleaning, thereby calculating an average of these detergencies as the detergency (%) of each detergent composition.

(Glass Corrosion Test)

A chemically reinforced glass test piece for glass corrosion test was dipped in each detergent composition kept at 70° C. for 48 hours. The test piece taken out of the detergent composition was thoroughly rinsed with pure ion exchange water, was subjected to air blowing and dried by air in the room.

The glass corrosion test was made by measuring the ratio (%) of a reduction in weight (the figures to which the character (−) is attached show that the weight is reduced) and by rating visually.

As to the reduction in weight, five test pieces were treated using each detergent composition in the above condition to find the ratio of a reduction in the weight of each test piece which reduction was caused by dissolution of the glass by corrosion, thereby calculating an average of these the ratios. Also, as to the visual rating, five test pieces were treated in the same condition as above to visually rate the state of the surface of the glass after treated. The criterion at this time was as follows.

(Criterion of Visual Rating)

⊙: No change is observed.

○: Partially whitened very slightly.

Δ: Partially whitened.

x: Whitened entirely.

(Test for the Stability of the Composition (10 Minutes After Being Compounded))

The components (a) to (f) were poured into a 500 mL glass beaker in a total amount of 500 g and mixed, followed by stirring vigorously (at 500 to 600 r/min for 10 minutes) at ambient temperature by a 5 cm magnetic stirrer. The state of the composition after it was allowed to stand for 10 minutes at ambient temperature was confirmed visually and by using a stirring rod.

(Criterion of Stability)

⊙: Uniform and transparent state, cloud, layer separation and precipitates are all unobserved.

○: Uniform but not transparent, some cloud is observed but layer separation and precipitates are not observed.

x: Layer separation arises and viscous materials or precipitates are observed.

(Test for the Stability of the Composition (After Being Stored at 60° C. for 24 Hours))

The components (a) to (f) were poured into a 500 mL glass beaker in a total amount of 500 g and mixed, followed by stirring vigorously (at 500 to 600 r/min for 10 minutes) at ambient temperature by a 5 cm magnetic stirrer. The state of the composition after it was allowed to stand for 10 minutes at ambient temperature was confirmed visually and by using a stirring rod. Also, this composition was poured into a 500 mL of a polyethylene bottle, which was then closed by a lid and stored at 60° C. for 24 hours. Thereafter, the state of the composition 30 minutes after the temperature of the composition was returned to ambient temperature was confirmed visually and by using a stirring rod.

(Criterion of Stability)

⊙: Uniform and transparent state, cloud, layer separation and precipitates are all unobserved.

○: Uniform but not transparent, some cloud is observed but layer separation and precipitates are not observed.

x: Layer separation arises and viscous materials or precipitates are observed.

TABLE 1

| Detergent composition(mass %) | | Examples | | | | |
|---|---|---|---|---|---|---|
| | | 1 | 2 | 3 | 4 | 5 |
| (a)Inorganic alkali agent | Lithium hydroxide | | | 3.0 | | |
| | Sodium hydroxide | 20.0 | | | | |
| | Pottasium hydroxide | | 2.0 | | 5.0 | 4.0 |
| (b)Anionic surfactant Nonionic surfactant | Sodium lauryl sulfate | 0.5 | | | | |
| | sodium (POE3)lauryl ether sulfate | | | | | |
| | Sodium dodecylbenzenesulfonate | | | 2.5 | | |
| | Sodium dodecyl diphenyl ether disulfonate | | 3.0 | | 12.0 | 1.7 |
| | (POE12)C12~14 alcohol ether | | | | | |
| | (POE40) octyl phenyl ether | | | | | |
| (c)Calcium salt [based on a calcium ion] | Calcium chloride | | | | | 1.5 [0.0542] |
| | Calcium propionate | | | | | |
| | Calcium benzoate | 0.5 [0.071] | | | | |
| | Calcium lactate | | | | 2.0 [0.367] | |
| | Calcium gluconate | | 1.0 [0.0931] | 20.0 [1.86] | | |
| | Calcium pantothenate | | | | | |
| (d)Calcium ion-sequestering agent. the numerals in [ ] are the chelate stability constant logKCa | Gluconic acid[1.2] | | | | | |
| | Maleic acid [1.2] | | | 3.0 | | |
| | Tartaric acid [1.8] | | | | | |
| | Oxalic acid [3.0] | | | | | |
| | Citric acid [3.2] | | 1.5 | | | |
| | 1-hydroxyethylidene-1,1-diphosphonic acid [6.0] | | | | 1.0 | |
| | Nitrilotriacetic acid [6.5] | | | | | |
| | Aminotri(methylenephosphonic acid)[6.7] | | | | | |
| | Ethylenediaminetetraacetic acid[10.7] | 1.0 | 0.5 | | | 1.0 |
| (e)Water-soluble organic aolvent, the numerals in [ ] are the solubility parameter $[J^{1/2} \cdot cm^{-3/2}]$ | N,N-dimethylacetoamide[21.7] | | | | | |
| | Triethylene glycol monomethyl ether[24.6] | | | | | 1.5 |
| | Diethylene glycol monomethyl ether[25.1] | | 3.0 | | 1.0 | |
| | Heptaethylene glycol[25.7] | | | 1.0 | | |
| | Ethyl alcohol[25.8] | 5.0 | | | 6.0 | 3.0 |
| | Dipropylene glycol[27.6] | | | | | |
| | Triethylene glycol[28.7] | | | | | |
| (f)Water | | 73.0 | 89.0 | 84.5 | 78.0 | 91.8 |

TABLE 1-continued

|  | Detergent composition(mass %) | Examples | | | | | |
|---|---|---|---|---|---|---|---|
|  |  | 6 | 7 | 8 | 9 | 10 | 11 |
| (a)Inorganic alkali agent | Lithium hydroxide |  |  |  |  |  |  |
|  | Sodium hydroxide |  |  | 3.0 |  |  |  |
|  | Pottasium hydroxide | 5.0 | 10.0 |  | 14.0 | 25.0 | 7.0 |
| (b)Anionic surfactant Nonionic surfactant | Sodium lauryl sulfate |  |  |  |  |  |  |
|  | sodium (POE3)lauryl ether sulfate |  |  |  |  | 0.5 | 0.8 |
|  | Sodium dodecylbenzenesulfonate |  |  |  |  |  |  |
|  | Sodium dodecyl diphenyl ether disulfonate | 3.0 | 2.5 |  | 2.5 |  |  |
|  | (POE12)C12~14 alcohol ether |  |  | 4.0 |  |  |  |
|  | (POE40) octyl phenyl ether |  |  | 4.0 |  |  |  |
| (c)Calcium salt [based on a calcium ion] | Calcium chloride |  |  |  |  |  |  |
|  | Calcium propionate | 0.2 [0.0422] |  |  |  |  |  |
|  | Calcium benzoate |  |  |  |  | 1.0 [0.142] |  |
|  | Calcium lactate |  |  |  |  |  |  |
|  | Calcium gluconate |  | 1.5 [0.140] |  | 1.5 [0.140] |  | 0.2 [0.019] |
|  | Calcium pantothenate |  |  | 0.5 [0.0421] |  |  |  |
| (d)Calcium ion-sequestering agent. the numerals in [ ] are the chelate stability constant logKCa | Gluconic acid[1.2] | 2.0 |  |  |  | 10.0 |  |
|  | Maleic acid [1.2] |  |  |  |  |  |  |
|  | Tartaric acid [1.8] |  | 1.0 |  | 3.5 |  |  |
|  | Oxalic acid [3.0] |  |  |  |  |  |  |
|  | Citric acid [3.2] | 5.5 |  |  |  |  | 5.0 |
|  | 1-hydroxyethylidene-1,1-diphosphonic acid [6.0] |  |  |  |  |  |  |
|  | Nitrilotriacetic acid [6.5] |  |  | 1.2 |  | 0.5 | 0.2 |
|  | Aminotri(methylenephosphonic acid)[6.7] |  | 0.5 |  | 0.5 |  |  |
|  | Ethylenediaminetetraacetic acid[10.7] | 0.5 |  |  |  |  |  |
| (e)Water-soluble organic aolvent, the numerals in [ ] are the solubility parameter [J$^{1/2}$·cm$^{-3/2}$] | N,N-dimethylacetoamide[21.7] |  |  | 28.0 |  |  |  |
|  | Triethylene glycol monomethyl ether[24.6] |  |  |  |  |  |  |
|  | Diethylene glycol monomethyl ether[25.1] |  |  |  |  |  | 1.0 |
|  | Heptaethylene glycol[25.7] |  | 5.0 |  |  |  |  |
|  | Ethyl alcohol[25.8] |  |  |  |  | 5.0 | 5.0 |
|  | Dipropylene glycol[27.6] |  | 1.5 |  | 15.0 |  |  |
|  | Triethylene glycol[28.7] | 2.0 |  |  |  |  |  |
| (f)Water |  | 81.8 | 78.0 | 59.8 | 63.0 | 59.0 | 81.1 |

TABLE 2

|  |  | Example | | | | | | | | | | |
|---|---|---|---|---|---|---|---|---|---|---|---|---|
|  |  | 1 | 2 | 3 | 4 | 5 | 6 | 7 | 8 | 9 | 10 | 11 |
| Detergency test [detergency(%)] | ADC resin stains | 91 | 90 | 87 | 90 | 88 | 90 | 93 | 97 | 96 | 95 | 92 |
|  | Sulfur-containing thiourethane resin stains | 98 | 86 | 88 | 91 | 90 | 91 | 97 | 88 | 98 | 98 | 97 |
| Glass corrosion test | Reduction in weight(%) (− means a reduction in weight) | −0.017 | −0.010 | −0.016 | −0.016 | −0.018 | −0.012 | −0.008 | −0.018 | −0.009 | −0.017 | −0.014 |
|  | Visual rating | ◎ | ◎ | ◎ | ◎ | ◎ | ◎ | ◎ | ◎ | ◎ | ◎ | ◎ |
| Composition stability | 10 minutes after compounded | ○ | ◎ | ◎ | ◎ | ◎ | ◎ | ◎ | ◎ | ◎ | ◎ | ◎ |
|  | 60° C. after 24 hours | ○ | ◎ | ○ | ○ | ○ | ◎ | ◎ | ○ | ◎ | ○ | ◎ |

TABLE 3

| | Detergent composition (mass %) | Comparative example | | | | | | |
|---|---|---|---|---|---|---|---|---|
| | | 1 | 2 | 3 | 4 | 5 | 6 | 7 |
| (a)Alkali agent | Diethanolamine | 20.0 | | | | | | |
| | Lithium hydroxide | | | 3.0 | | | | 3.0 |
| | Sodium hydroxide | | | | 5.0 | | | |
| | Pottasium hydroxide | | 1.0 | | | 4.0 | 5.0 | |
| (b) Anionic surfactant Nonionic surfactant Cationic surfactant | Benzalconium chloride (C8~C18) | | | | 5.0 | | | |
| | Sodium lauryl sulfate | 0.5 | | | | | | |
| | sodium (POE3)lauryl ether sulfate | | | | | | | |
| | Sodium dodecylbenzenesulfonate | | | | | | | 2.5 |
| | Sodium dodecyl diphenyl ether disulfonate | | 3.0 | | 22.0 | 1.7 | 3.0 | |
| | (POE12)C12~14 alcohol ether | | | | | | | |
| | (POE40) octyl phenyl ether | | | | | | | |
| (c)Calcium salt [based on calcium ion] | Magnesium chloride | | | | | 1.5[0] | | |
| | Calcium propionate | | | | | | 0.04 [0.00860] | |
| | Calcium benzoate | 0.5 [0.071] | | | | | | |
| | Calcium lactate | | | | 2.0 [0.367] | | | |
| | Calcium gluconate | | 1.0 [0.0931] | 20.0 [1.86] | | | | 20.0 [1.86] |
| | Calcium pantothenate | | | | | | | |
| (d)Calcium ion-sequestering agent, the numerals in [ ] are the chelate stability constant log KCa | Gluconic acid[1.2] | | | | | 2.0 | 2.0 | |
| | Maleic acid[1.2] | | | 3.0 | | | | |
| | Tartaric acid[1.8] | | | | | | | |
| | Oxalic acid[3.0] | | | | 1.0 | | | |
| | Citric acid[3.2] | | 1.5 | | | | 5.5 | |
| | 1-hydroxyethylidene-1,1-diphosphonic acid [6.0] | | | | 0.5 | | | |
| | Nitrilotriacetic acid[6.5] | | | | | | | 0.05 |
| | Aminotri(methylenephosphonic acid)[6.7] | | | | | | | |
| | Ethylenediaminetetraacetic acid[10.7] | 1.0 | 0.5 | | | 0.3 | 0.5 | |
| (e)Water-soluble organic solvent, the numerals in [ ] are the solublity parameter [$J^{1/2} \cdot cm^{-3/2}$] | n-octyl alcohol[20.2] | | | | | | | |
| | Triethylene glycol monomethyl ether[24.6] | | | | | 1.5 | | |
| | Diethylene glycol monomethyl ether[25.1] | | 3.0 | | | | | |
| | heptaethylene glycol[25.7] | | | | 2.0 | | | 1.0 |
| | Ethyl alcohol[25.8] | 5.0 | | | 10.0 | | | 6.0 |
| | Dipropylene glycol[27.6] | | | | | | | |
| | Triethylene glycol[28.7] | | | | | | 2.0 | |
| (f)Water | | 73.0 | 90.0 | 67.0 | 59.5 | 89.0 | 82.0 | 67.4 |

| | Detergent composition (mass %) | Comparative example | | | | | | |
|---|---|---|---|---|---|---|---|---|
| | | 8 | 9 | 10 | 11 | 12 | 13 | 14 |
| (a)Alkali agent | Diethanolamine | | | | | | | |
| | Lithium hydroxide | | | | 3.0 | | 3.0 | |
| | Sodium hydroxide | 3.0 | | | | | | 3.0 |
| | Pottasium hydroxide | | 20.0 | | 4.0 | 25.0 | | |
| (b) Anionic surfactant Nonionic surfactant Cationic surfactant | Benzalconium chloride (C8~C18) | | | | | | | |
| | Sodium lauryl sulfate | | | | | | | |
| | sodium (POE3)lauryl ether sulfate | | | | | 0.5 | | |
| | Sodium dodecylbenzenesulfonate | | | | | 2.5 | 2.5 | |
| | Sodium dodecyl diphenyl ether disulfonate | | | 10.0 | 0.4 | | | |
| | (POE12)C12~14 alcohol ether | 4.0 | | | | | | 4.0 |
| | (POE40) octyl phenyl ether | 4.0 | | | | | | 4.0 |
| (c)Calcium salt [based on calcium ion] | Magnesium chloride | | | | | | | |
| | Calcium propionate | | | | 0.2 [0.0422] | 10.0 [2.15] | | |
| | Calcium benzoate | | | | | | 1.0 [0.142] | |
| | Calcium lactate | | | | | | | |
| | Calcium gluconate | | | 10.0 [0.931] | | | 20.0 [1.86] | |
| | Calcium pantothenate | 0.5 [0.0421] | | | | | | 0.5 [0.0421] |
| (d)Calcium ion-sequestering agent, the numerals in [ ] are the chelate stability constant log KCa | Gluconic acid[1.2] | | | | | 18.0 | | |
| | Maleic acid[1.2] | | | | 3.0 | | 3.0 | |
| | Tartaric acid[1.8] | | 10.0 | | | | | |
| | Oxalic acid[3.0] | | | | | | | |
| | Citric acid[3.2] | | | | | | | |
| | 1-hydroxyethylidene-1,1-diphosphonic acid [6.0] | | | | | | | |
| | Nitrilotriacetic acid[6.5] | 1.2 | | | | 0.5 | | |
| | Aminotri(methylenephosphonic acid)[6.7] | | | | | | | 0.1 |
| | Ethylenediaminetetraacetic acid[10.7] | | | 1.0 | | | | |

TABLE 3-continued

| (e)Water-soluble organic solvent, the numerals in [ ] are the solublity parameter [J^{1/2}·cm^{-3/2}] | n-octyl alcohol[20.2] Triethylene glycol monomethyl ether[24.6] Diethylene glycol monomethyl ether[25.1] heptaethylene glycol[25.7] Ethyl alcohol[25.8] Dipropylene glycol[27.6] Triethylene glycol[28.7] | 28.0 | | 1.5 | 10.0 22.0 | 1.0 6.0 | 5.0 | 35.0 |
|---|---|---|---|---|---|---|---|---|
| (f)Water | | 59.3 | 18.0 | 92.8 | 74.5 | 50.0 | 71.5 | 53.4 |

TABLE 4

| | | Comparative example | | | | | | |
|---|---|---|---|---|---|---|---|---|
| | | 1 | 2 | 3 | 4 | 5 | 6 | 7 |
| Detergency test [detergency (%)] | ADC resin stains | 63 | 70 | 82 | 79 | 87 | 88 | 86 |
| | Sulfur-containing thiourethane resin stains | 60 | 56 | 65 | 64 | 90 | 90 | 85 |
| Glass corrosion test | Reduction in weight(%) (− means a reduction in weight) | −0.016 | −0.012 | 0.023 | −0.009 | −0.592 | −0.253 | 0.012 |
| | Visual rating | ◎ | ◎ | X | ◎ | X | X | Δ |
| Composition stability | 10 minutes after compounded | ◎ | ◎ | X | X | ○ | ◎ | ○ |
| | 60° C. after 24 hours | ○ | ◎ | X | X | X | ◎ | X |

| | | Comparative example | | | | | | |
|---|---|---|---|---|---|---|---|---|
| | | 8 | 9 | 10 | 11 | 12 | 13 | 14 |
| Detergency test [detergency (%)] | ADC resin stains | 70 | 80 | 75 [redeosition] | 88 | 88 | 70 | 83 |
| | Sulfur-containing thiourethane resin stains | 65 | 72 | 80 [not good at rinsing] | 86 | 81 | 68 | 62 |
| Glass corrosion test | Reduction in weight(%) (− means a reduction in weight) | 0.016 | −0.009 | −0.02 | 0.016 | −0.114 | −0.017 | −0.016 |
| | Visual rating | Δ | ◎ | ◎~○ | Δ~X | Δ~X | ◎ | ◎ |
| Composition stability | 10 minutes after compounded | X | X | X | X | ○ | X | ○ |
| | 60° C. after 24 hours | X | X | X | X | ○ | X | X |

The invention claimed is:

1. A detergent composition consisting essentially of:
   (a) 2 to 30% by weight of an inorganic alkali selected from the group consisting of sodium hydroxide and potassium hydroxide;
   (b) 0.5 to 15% by weight of at least one surfactant selected from the group consisting of an anionic surfactant and a nonionic surfactant;
   (c) 0.01 to 2% by weight (based on calcium ion) of calcium gluconate;
   (d) 0.1 to 15% by weight of a calcium ion-sequestering agent;
   (e) 1 to 30% by weight of a water-soluble organic solvent; and
   (f) 20 to 95% by weight of water,
   wherein the calcium ion-sequestering agent as the component (d) is a combination of ($d_1$) an oxycarboxylic acid and/or a calcium ion-sequestering agent having a chelate stability constant log $K_{ca}$ of 1 to 4 with ($d_2$) a calcium ion-sequestering agent having a chelate stability constant log $K_{ca}$ of 5 to 13 at a ratio ($d_1/d_2$: weight ratio) of ($d_1$) to ($d_2$) of 98/2 to 50/50, when it forms a chelate in combination with a calcium ion.

2. The detergent composition of claim 1, wherein the solubility parameter of the water-soluble organic solvent as the component (e) is 21.5 to 31 $J^{1/2}$·cm$^{-3/2}$.

3. The detergent composition of claim 1, wherein the component (e) is one or more selected from the group consisting of (e-1) a polyvalent alcohol, (e-2) a nitrogen-containing compound and (e-3) an alkylene oxide compound.

4. The detergent composition of claim 3, wherein the compounds (e-1), (e-2) and (e-3) are at least one type selected from the group consisting of the following compounds:
   (e-1) diethylene glycol, triethylene glycol, tetraethylene glycol, pentaethylene glycol, hexaethylene glycol, heptaethylene glycol, octaethylene glycol, nonaethylene glycol, decaethylene glycol, propylene glycol, dipropylene glycol, tripropylene glycol and trimethylene glycol;
   (e-2) acetamide, N,N-dimethylacetamide, acetonitrile, amylamine, allylamine, isobutylamine, isopropanolamine, isopropylamine, N-ethylethanol amine, morpholine, N-ethylmorpholine, ethylenediamine, caprolactam, diamylamine, diethanolamine, diethylamine, diethylenetriamine, cyclohexylamine, dimethylamine, tetraethylenepentamine, N,N,N',N'-tetramethylethylenediamine, triethanolamine, 2-pyrrolidone, N-methylpyrrolidone, N-methylformamide, monoethanolamine, monomethylamine and monoethylamine; and (e-3) (POE 1-5) monomethyl ether, (POE 1-5) monoethyl ether, (POE 1-5) monopropyl ether, (POE 1-5 monobutyl ether, (POE 1-2) monoisobutyl ether and (POE 1-2) monoallyl ether.

5. A method of cleaning a plastic lens molding glass die, comprising the step of (A) cleaning a plastic lens molding glass die with the detergent composition as claimed in claim 1.

6. A method of cleaning a plastic lens molding glass die, comprising the steps of (A) cleaning a plastic lens molding glass die with the detergent composition of claim 1, and (B) rinsing the cleaned molding glass die with rinsing water.

7. The method of claim 5 or 6, wherein the step (A) comprises dipping a plastic lens molding glass die in the detergent composition to clean the die.

8. The method of claim 5 or 6, wherein the step (A) comprises dipping and further fluctuating the plastic lens molding glass die in the detergent composition to clean the die.

9. The method of claim 5 or 6, wherein the step (A) comprises dipping and further ultrasonically cleaning the plastic lens molding die in the detergent composition to clean the die.

10. The detergent composition of claim 1, comprising 4 to 30% by weight of component (a).

11. The detergent composition of claim 1, comprising 3 to 30% by weight of component (e).

12. The method of cleaning a plastic lens molding glass die of claim 5, further comprising a step of cleaning the plastic lens molding glass die from a plastic lens resin having a refractive index of 1.55 or more.

* * * * *